United States Patent [19]

Komuro

[11] Patent Number: 4,838,407

[45] Date of Patent: Jun. 13, 1989

[54] HARNESS-RECEIVING APPARATUS

[75] Inventor: Katsumi Komuro, Tokyo, Japan

[73] Assignee: AMP Incorporated, Harrisburg, Pa.

[21] Appl. No.: 288,643

[22] PCT Filed: Jan. 20, 1988

[86] PCT No.: PCT/US88/00184

§ 371 Date: Sep. 12, 1988

§ 102(e) Date: Sep. 12, 1988

[87] PCT Pub. No.: WO88/06354

PCT Pub. Date: Aug. 25, 1988

[30] Foreign Application Priority Data

Feb. 20, 1987 [JP] Japan ............................... 62-024064

[51] Int. Cl.$^4$ ............................................... B65G 47/24

[52] U.S. Cl. .................................... 198/406; 198/409; 29/759; 29/749; 29/747

[58] Field of Search ........................ 29/759, 749, 757; 198/406, 409

[56] References Cited

U.S. PATENT DOCUMENTS

| | | | |
|---|---|---|---|
| 3,372,815 | 3/1968 | Lovendusky | 198/408 |
| 3,616,510 | 11/1971 | Kroehs | 29/747 |
| 3,693,231 | 9/1972 | Scharf | 29/563 |
| 3,858,292 | 1/1975 | Gudmestad | 29/753 |
| 4,055,889 | 11/1977 | Fusco et al. | 29/710 |
| 4,087,908 | 5/1978 | Fusco et al. | 29/753 |
| 4,409,734 | 10/1983 | Baraglia et al. | 29/749 |
| 4,551,893 | 11/1985 | Ikeda et al. | 29/749 |
| 4,563,810 | 1/1986 | Adlon et al. | 29/749 |
| 4,584,757 | 4/1986 | Adlon et al. | 29/564.6 |

FOREIGN PATENT DOCUMENTS 625128 3/1963 Belgium .

*Primary Examiner*—P. W. Echols
*Assistant Examiner*—R. Jordon
*Attorney, Agent, or Firm*—William B. Noll; Adrian J. LeRue

[57] ABSTRACT

A harness-receiving apparatus for receiving an electrical harness comprising electrical wires connected at respective ends thereof to electrical connectors and fed from a harness-making machine (HMM) comprises: a first carrier rail positioned with respect to the harness-naking machine (HMM) for receiving one of the connectors for movement therealong while the other of the connectors hangs down during movement of the harness along the first carrier rail; a second carrier rail at an outer end of the first carrier rail and being directed downwardly with respect to the first carrier rail so that the one connector is transferred from the first carrier rail to the second carrier rail while the other connector continues to hang down during the movement of the one connector and the harness along the second carrier rail; and a harness-receiving member positioned below the second carrier rail for receiving the harness from the second carrier rail and arranging the harness in the direction of the second carrier rail.

5 Claims, 2 Drawing Sheets

HARNESS-RECEIVING APPARATUS

BACKGROUND OF THE INVENTION

This invention relates to a harness-receiving apparatus for a harness-making machine to receive harnesses continuously made by the harness-making machine and fed to the harness-receiving apparatus.

An electrical harness comprising a plurality of electrical wires connected between electrical connectors is utilized for various purposes, and various machines are known which will manufacture the harnesses automatically. For example, a harness-making machine wherein end portions of electrical wires are arranged along a plane, the end portions are terminated to electrical contacts of an electrical connector, the wires are extended via a wire-extending device to a specified length, and another electrical connector is then connected with the other ends of the wires. Such a machine is disclosed in Japanese Unexamined Patent Publication No. 57-19770.

This harness-making machine enables the harnesses to be manufactured automatically and continuously, but problems often arise in the harness-receiving apparatus which receives the completed harnesses that are fed thereto. In a conventional harness-making machine, a box is provided at a position to which the completed harnesses are fed from the machine so as to receive the harnesses. In such a case, the harnesses fed from the machine are randomly piled together when they are deposited into the receiving box thereby becoming entangled with one another. Such a condition creates a problem in the subsequent handling of the harnesses because the wires of the harnesses or the wires and the connectors are tangled together in the receiving box.

In view of the problems of the random arrangement of the harnesses arising in the prior art harness-receiving apparatus, the present invention provides a harness-receiving apparatus which enables the harnesses fed from the harness-making machine to be received and arranged in such a manner that the above-mentioned tangling problems are avoided.

SUMMARY OF THE INVENTION

The harness-receiving apparatus present invention comprises a first carrier rail extending in a substantially horizontal plane and carrying harnesses comprising a plurality of electrical wires connected at their respective ends to electrical connectors. The harnesses are fed from the harness-making machine and are carried along the first carrier rail in such a manner that the connectors at one end of the harnesses are retained in engagement with the carrier rail while the connectors at the other end of the harnesses hang downwardly and are suspended by the wires. A second carrier rail extends from the first carrier rail in a downward direction at an oblique angle thereto. The harnesses carried by the first carrier rail are received by the second carrier rail and they move downwardly therealong while still in the suspended condition while being received by a harness-receiving member located directly underneath the second carrier rail.

When the harnesses fed from the harness-making machine are received by the harness-receiving apparatus having the above construction, the harnesses fed from the harness-making machine are carried along the horizontal plane by the first carrier rail and the connectors at the other end of the wires are freely suspended by the wires as a result of their weight. The harnesses are then carried obliquely downward by the second carrier rail, and while the harnesses are carried obliquely downward, the suspended connectors first engage the harness-receiving member positioned below the second carrier rail, and then the harnesses are arranged in an orderly manner on the harness-receiving member so that the wires connected between the two connectors are arranged in the direction in which the harnesses were carried, i.e. they are arranged parallel and untangled.

The invention is described by way of example by reference to the following description with reference to the accompanying drawings.

DETAILED DESCRIPTION OF PREFERRED EMBODIMENT

Figure 1:
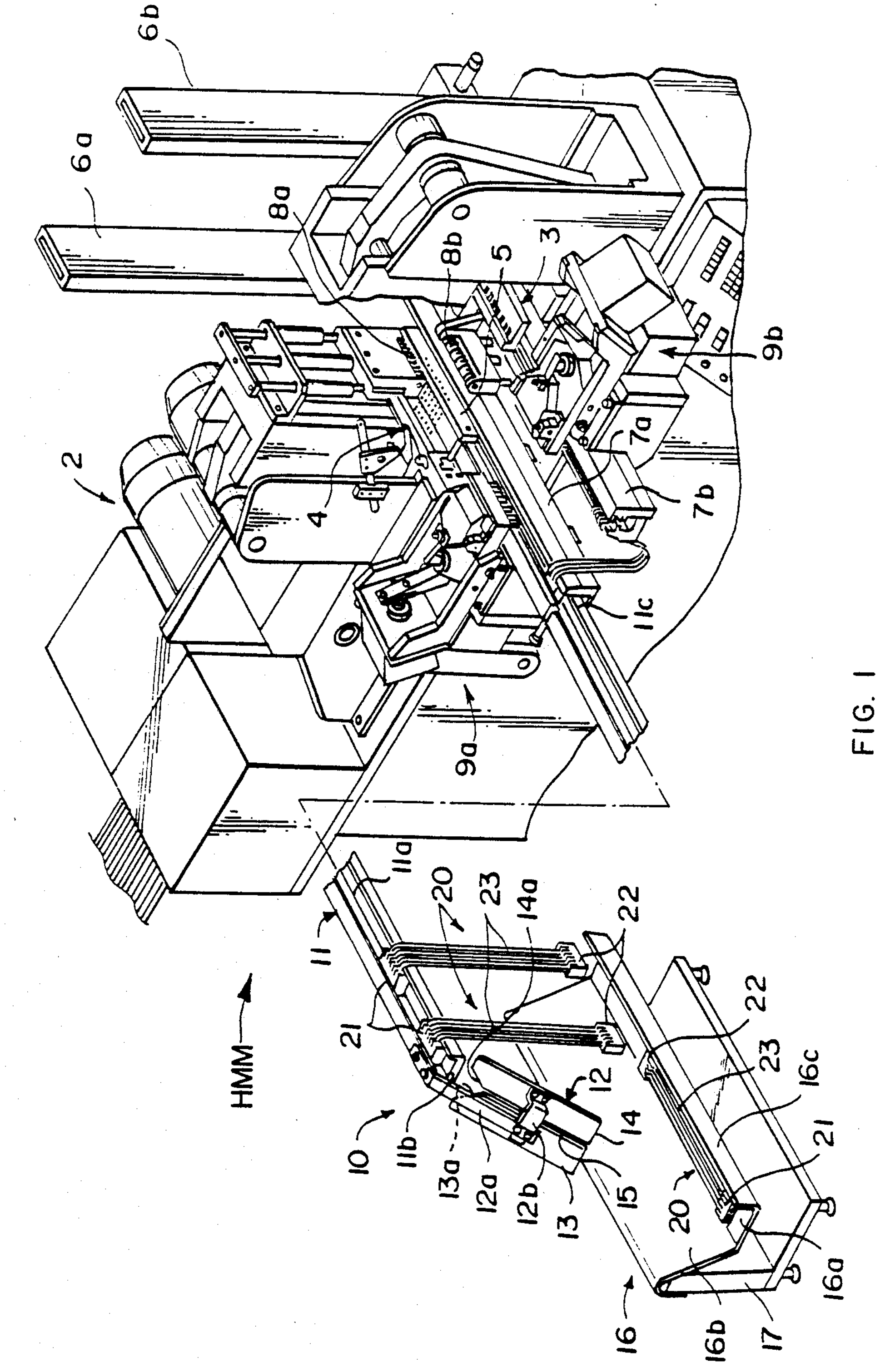
FIG. 1 is a perspective view showing a harness-making machine provided with a harness-receiving apparatus according to the present invention.

FIG. 1 shows a harness-making machine HMM equipped with a harness-receiving apparatus according to the present invention. The harness-making machine comprises a wire feed device 2, a first wire-connecting device 3, a second wire-connecting device 4, a shuttle 5 for leading the ends of electrical wires fed from the wire feed device 2 to the first wire-connecting device 3. Connector storage boxes **6*a*,6*b* for storing electrical connectors have guide rails 7*a*,7*b* connected thereto for successively feeding the connectors inside the storage boxes 6*a*,6*b*. Feed rollers 8*a*,8*b* are in alignment with wire-connecting devices 3,4 for feeding a required length of the wires to wire-connecting device 3 and a test device 9*a*,9*b*** for testing the electrical connections between the connectors and the wires forming the harness.

Electrical harnesses are made by this machine according to the following: Ends of electrical wires fed from the wire feed device 2 are engaged by the shuttle 4 and guided to the first wire connecting device 3 at which the ends of the wires are electrically connected to electrical contacts of a connector fed along the guide rail **7*b* from the connector storage box 6*b*. Then a specified length of the wires are fed by the feed rollers 8*a*,8*b*, and the other ends of the wires are electrically connected at the second wire-connecting device 4 to the electrical contacts of a connector fed from the connector storage box 6*a* along the guide rail 7*b*, the wires also being sheared from the ones from wire feed device 2. Thus, the manufacture of an electrical harness is completed. The electrical connections between the connectors and wires of the harness are then tested by the harness-testing device 9*a*,9*b*, and the harness is again fed along the guide rails 7*a*,7*b*** to the ends thereof.

The harnesses manufactured by the harness-making machine are then received and arranged by the harness-receiving apparatus 10 which comprises a first carrier rail 11, a second carrier rail 12 and a harness-receiving member 16. First carrier rail 11 has one end **11*c* and another end 11*b* and it extends in a substantially horizontal plane from the outer end of guide rail 7*a*. Second carrier rail 12 includes plates 13,14** joined to the outer end 11*b* of first carrier rail 11 by members 12*a*,12b, and they extend obliquely in a downward direction therefrom. Harness-receiving member 16 is positioned directly underneath second carrier rail 12 and a pedestal 17 supports the harness-receiving member 16.

The first carrier rail 11 has a carrier channel 11*a* which retains and carries therealong connector 21 of harness 20 from guide rail 7*a*. Thus, when harness 20 is fed along guide rails 7*a*,7*b*, connector 21 is received in carrier channel 11*a* of first carrier rail 11 as connector 21 moves free of guide rail 7*a* while connector 22 moves free of guide rail 7*b* and dangles freely from connector 21 via wires 23. Harness 20 is then carried along first carrier rail 11 in the condition that the connector 22 is linked to the connector 21 by wires 23 of the harness and suspended therefrom under its own weight.

Second carrier rail 12 has a space 15 formed by a specified distance between plates 13,14. The end 11*b* of first carrier rail 11 and the upper ends of plates 13,14 are aligned. Harness 20 is carried along first carrier rail 11 while connector 21 is retained in carrier channel 11*a* of first carrier rail 11 and is then transferred onto second carrier rail 12. During this transfer, connector 21 of harness 20 moves onto second carrier rail 12 by engagement with plates 13,14, and wires 23 connected with connector 21 extend through space 15 while connector 22 remains suspended from connector 21 via wires 23 by its own weight. Tapered surfaces 13*a*,14*a* widening upward are located at the upper ends of plates 13,14 to ensure a smooth transfer of connector 21 of the harness from first carrier rail 11 to second carrier rail 12.

Harness 20 is then moved along the inclined second carrier rail 12 and placed on harness-receiving member 16 located directly underneath second carrier rail 12. This process is best explained with reference to FIG. 2. Harness-receiving member 16 comprises surfaces 16*a*,*b*,*c*, surface 16*b* is inclined at an angle with respect to second carrier rail 12 while surface 16*a* is substantially horizontal and joined to the lower end of inclined face 16*b*. Side surface 16*c* is substantially normal relative to surface 16*a* and joined with the outer end thereof. Surface 16*a* extends in the carrying direction of second carrier rail 12.

Figure 2:
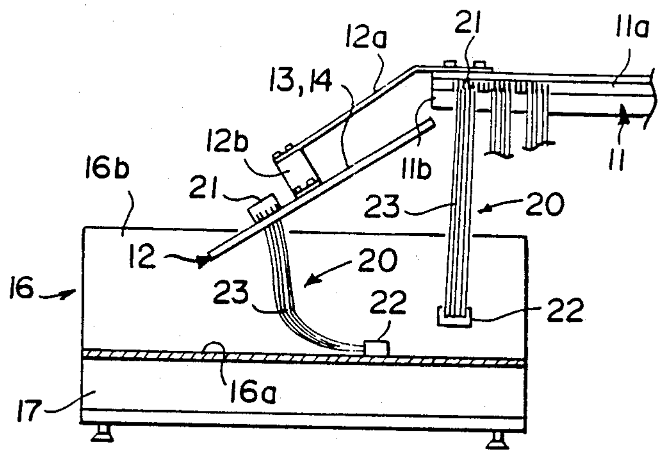
FIG. 2 is side elevational view partly in section of the harness-receiving apparatus.

When connector 21 is placed on second carrier rail 12 and harness 20 is carried therealong with connector 22 suspended from connector 21 via wires 23 passing through space 15, suspended connector 22 first comes into contact with lower surface 16*a* of harness-receiving member 16, harness 20 continues to move in the carrying direction and is then positioned on lower surface 16*a*, as shown in FIG. 2 with connector 21 located forward of connector 22. Accordingly, harnesses 20 fed from the harness-making machine are successively carried to the harness-receiving member 16 by first carrier rail 11 and second carrier rail 12, and then harnesses 20 are successively arranged in a parallel manner on top of one another on harness-receiving member 16 in the same direction as that of carrier rails 11,12. Therefore, the possibility of wires 23 of harnesses 20 becoming entangled with each other is very remote, thus the handling of the harnesses for a succeeding operation can be simplified.

Figure 3:
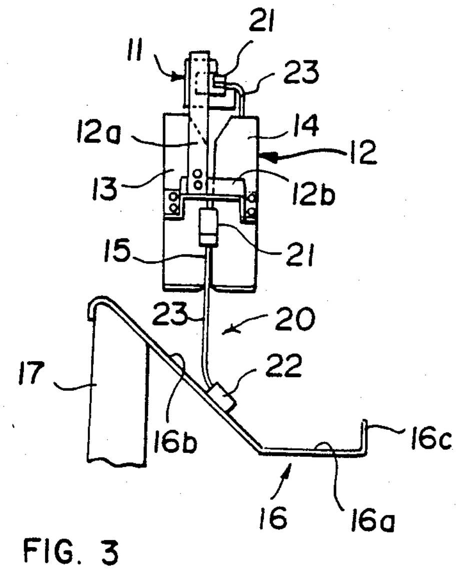
FIG. 3 is front elevational view of a different position of the harness-receiving member with respect to the second rail thereof.

According to the above description, harnesses 20 are placed on lower surface 16*a* of harness-receiving member 16, however, harnesses 20 carried by carrier rails 11,12 can be placed on inclined surface 16*b* of harness-receiving member 16 by placing inclined surface 16*b* directly underneath second carrier rail 12, as shown in FIG. 3. When this is done harnesses 20 slide down inclined surface 16*b* onto surface 16*a*. Therefore, harnesses 20 carried by first and second carrier rails 11,12 are successively arranged in parallel on surface 16*a*; surface 16*c* preventing the harnesses from falling off surface 16a in FIGS. 1 or 3.

First carrier rail 11 is aligned and connected with guide rail 7*a* of the harness-making machine, however, guide rail 7*a* can be extended and thus also serve as the first carrier rail, and second carrier rail 12 can then be mounted to the extended guide rail 7*a* through the members 12*a*,12*b*.

According to the present invention, electrical harnesses fed from a harness-making machine are carried horizontally by connectors along a first carrier rail while the other connectors hang freely down and are suspended by the wires of the harnesses; the harnesses are then carried obliquely downward by a second carrier rail attached to the first carrier rail. The harnesses are thereafter received and arranged by a harness-receiving member positioned below the second carrier rail in such a manner that the suspended connectors are first placed on the harness-receiving member while the harnesses are still carried obliquely downward along the second carrier rail, and then the harnesses are arranged in parallel on the harness-receiving member so that the wires connected between the two connectors are arranged in the direction of movement along the second carrier rail. Therefore, the harnesses are neatly arranged and piled on the harness-receiving member, thus handling of the harnesses for subsequent operations is simplified because entanglement of the wires of the harnesses with one other is avoided.

I claim:

1. A harness-receiving apparatus for receiving an assembled electrical harness comprising a plurality of electrical wires connected at respective ends thereof to electrical connectors and fed from a harness-making machine (HMM), said apparatus including a first, generally horizontal, carrier rail positioned with respect to the harness-making machine (HMM) having a channel in which one connector of the connectors is received and moved therealong while the other connector hangs down during movement of the harness along the first carrier rail, and a second carrier rail at an outer end of the first carrier rail and directed downwardly with respect to the first carrier rail so that the one connector is transferred from the first carrier rail to the second carrier rail while the other connector continues to hang down during the movement of the one connector and the harness along the second carrier rail, and the harness-receiving member positioned below the second carrier rail for receiving the harness from the second carrier rail and arranging the harness in the direction of the second carrier rail.

2. A harness-receiving apparatus as claimed in claim 1, wherein said second carrier rail includes plates spaced from one another so as to provide a space therebetween through which the wires of the harness extend while the one connector moves along upper surfaces of the plates.

3. A harness-receiving apparatus as claimed in claim 1, wherein said harness-receiving member includes a horizontal surface on which the harness is disposed.

4. A harness-receiving apparatus as claimed in claim 1, wherein said harness-receiving member includes an inclined surface which is engaged by the other connector while the one connector moves along said second carrier rail, and a horizontal surface connected with a lower end of said inclined surface, the harness being disposed on the horizontal surface from the inclined surface.

5. A harness-receiving apparatus as claimed in claim 4, wherein said harness-receiving member includes a vertical surface connected to an outer end of said horizontal surface.

* * * * *